United States Patent [19]
Takiguchi et al.

[11] Patent Number: 5,810,692
[45] Date of Patent: Sep. 22, 1998

[54] DOWNSHIFT CONTROL DEVICE FOR AUTOMATIC TRANSMISSION

[75] Inventors: Masahiro Takiguchi; Yoshifumi Fujita, both of Fuji, Japan

[73] Assignee: Jatco Corporation, Japan

[21] Appl. No.: 742,980

[22] Filed: Oct. 25, 1996

[30]   Foreign Application Priority Data

Oct. 26, 1995 [JP] Japan .................................. 7-278567

[51] Int. Cl.$^6$ ................................................ F16H 61/08
[52] U.S. Cl. ............................................ 477/144; 477/148
[58] Field of Search ................................ 477/132, 133, 477/144, 148, 149

[56]            References Cited

U.S. PATENT DOCUMENTS 4,563,917  1/1986  Higashi et al. .......................... 477/133
4,671,139  6/1987  Downs et al. ........................... 477/148

*Primary Examiner*—Dirk Wright
*Attorney, Agent, or Firm*—Rossi & Associates

[57]            ABSTRACT

A downshift control device for an automatic transmission is provided in which a drive command is generated to a shift actuator when a shift command to change a gear ratio of the transmission is generated, to switch a shift valve and change oil paths, thereby to release a first engaging element that has been engaged in a first gear position established by the automatic transmission before the shifting operation, and engage a second engaging element that has been released in the first gear position, so as to establish a second gear position after the shifting operation. This downshift control device includes a pedal-depressed downshifting determining means for determining whether the automatic transmission is to be shifted down due to depression of an accelerator pedal, a delay time setting means for setting a delay time that ensures an increase of an engine speed due to depression of the accelerator pedal, and a shift valve operating timing control means for generating the drive command for switching the shift valve to the shift actuator when the delay time elapses after the pedal depressed downshifting determining means determines that the transmission is to be shifted down due to depression of the accelerator pedal.

5 Claims, 8 Drawing Sheets

|  | REV/C | H/C | LOW/C | L&R/B | LOW O.W.C | B/B | 2A | 3R | 4A |
|---|---|---|---|---|---|---|---|---|---|
| 1st |  |  | ○ | ◌ | ◉ |  |  |  |  |
| 2nd |  |  | ○ |  |  | ○ | ○ |  |  |
| 3rd |  | ○ | ○ |  |  |  | ○ | ○ |  |
| 4th |  | ○ |  |  |  | ○ | ○ | ○ | ○ |
| REV | ○ |  |  | ○ |  |  |  |  |  |

| SOLENOID GEAR POSITION | SHIFT SOLENOID A | SHIFT SOLENOID B |
|---|---|---|
| 1st | ○ | ○ |
| 2nd | × | ○ |
| 3rd | × | × |
| 4th | ○ | × |

○ ··· ON (DRAIN CLOSED)
× ··· OFF (DRAIN OPEN)

DOWNSHIFT CONTROL DEVICE FOR AUTOMATIC TRANSMISSION

BACKGROUND OF THE INVENTION

1. Field of the Invention

The present invention relates to a downshift control device for an automatic transmission of a motor vehicle, and more particularly to a technique for controlling the timing of operating a shift valve when the transmission is shifted down due to depression of an accelerator pedal.

2. Description of the Prior Art

There is known a shift control device for an automatic transmission as disclosed in Japanese Patent Application Laid-open No. 2-46362.

In order to perform good shift control for any type of a shifting operation, the control device disclosed in the above-identified publication selects one from a plurality of modes, such as power-off upshift mode (SYU mode), power-on downshift mode (SYD mode), power-on upshift mode (IPU mode) and power-off downshift mode (EPD), so as to control the oil pressure during the shifting operation depending upon the type of the shift mode.

The known shift control device as described above sets the power-on downshift mode (SYD mode) when the transmission is to be shifted down while an accelerator pedal is depressed, in which mode a shift valve is operated in response to a shift command, i.e., at the same time that it is determined that the transmission is to be shifted down. In this case, the shifting operation is terminated at different times between the case where the transmission is shifted down from the power-off state (where a driver's foot is apart from the accelerator pedal), and the case where the transmission is shifted down from the power-on state (where the accelerator pedal is depressed), resulting in a difference in shift shocks.

When the transmission is shifted down from its 3rd-speed to 2nd-speed gear position due to depression of the accelerator pedal, for example, a high clutch H/C that has been engaged in the 3rd-speed gear position is released by discharging a high clutch pressure PH/C, and a band brake B/B that has been released in the 3rd-speed gear position is engaged by discharging a 3rd-speed release pressure P3R. As shown in FIG. 11, a shift solenoid is driven at the same time that a downshift command to effect the 3rd-speed to 2nd-speed downshifting is generated (at a point of time t0), so as to operate or switch a shift valve from one state to another state.

Where the downshifting is initiated in the power-on state (the throttle opening is changed from 3/8 to 8/8), the engine speed Ne exceeds the turbine speed NT when the downshift command is generated. Since a high torque is received by the power transmitting system, the downshifting operation is immediately initiated with an increase of the turbine speed NT, and terminated at a point of time t1 when time T1 elapses from the point of time t0.

Where the downshifting is initiated in the power-off state (the throttle opening is changed from 0/8 to 8/8), the engine speed Ne is smaller than the turbine speed NT when the downshift command is generated, and it takes time T3 for the engine speed Ne to exceed the turbine speed NT. Accordingly, the downshifting is initiated at a point of time when the time T3 elapses from the point of time t0, and terminated at a point of time t2 when the time approximate to time T1 elapses from the initiation of the downshifting.

It is to be noted that the downshifting initiated in the power-off state is terminated at a later point of time than the downshifting initiated in the power-on state. If the shelf pressure or steady-state level of the 3rd-speed release pressure P3R is set so as to provide the optimum timing in which the transmission is shifted down due to depression of the accelerator pedal from the power-on state, the shelf pressure of the 3rd-speed release pressure P3R will be undesirably lowered before the downshifting is terminated when the transmission is shifted down due to depression of the accelerator pedal from the power-off state. Namely, the steady-state level of the 3rd-speed release pressure P3R is abruptly eliminated during the shifting, causing shocks due to the abrupt reduction of the release pressure P3R.

To solve the above problem, the pedal-depressed downshift mode is divided into a first submode in which the transmission is shifted down due to depression of the accelerator pedal from the power-on state, and a second submode in which the transmission is shifted down due to depression of the accelerator pedal from the power-off state, and oil pressure characteristics in the process of shifting are individually set for each of the first and second modes.

In this case, however, it is required by the division of the downshift mode to determine whether the vehicle is in the power-off state or power-on state before the pedal-depressed downshifting. Further, an increased amount of information related to the oil pressure characteristics in the process of shifting will be needed, for example, thereby to make the shift control more complicated.

SUMMARY OF THE INVENTION

It is an object of the present invention to provide a downshift control device for an automatic transmission which is adapted to switch a shift valve in response to a drive command to a shift actuator that is generated based on a command to effect a shifting operation, which control device performs simplified control to shift down the transmission while the accelerator pedal is being depressed, without determining the operated state of the accelerator pedal before the downshifting nor setting a plurality of control characteristics, assuring a similarly good shift feeling no matter whether the downshifting is initiated in the power-on state or power-off state.

The above object may be accomplished according to the principle of the present invention, which provides a downshift control device for an automatic transmission, wherein a drive command is generated to a shift actuator when a shift command to change a gear ratio of the transmission is generated, to switch a shift valve and change oil paths, thereby to release a first engaging element that has been engaged in a first gear position established by the automatic transmission before the shifting operation, and engage a second engaging element that has been released in the first gear position, so as to establish a second gear position after the shifting operation, the downshift control device comprising: as shown in FIG. 1, pedal-depressed downshifting determining means 101 for determining whether the automatic transmission is to be shifted down due to depression of an accelerator pedal; delay time setting means 102 for setting a delay time that ensures an increase of an engine speed due to depression of the accelerator pedal; and shift valve operating timing control means 103 for generating the drive command for switching the shift valve 105 to the shift actuator 104 when the delay time elapses after the pedal-depressed downshifting determining means determines that the transmission is to be shifted down due to depression of the accelerator pedal.

After the pedal-depressed downshifting determining means 101 determines during running of the vehicle that the transmission is to be shifted down due to depression of the accelerator pedal, the shift valve operating timing control means 103 generates a drive command to the shift actuator 104 so as to switch the shift valve 105 when the delay time set by the delay time setting means 102 elapses. With oil paths changed by switching the shift valve 105, the first engaging element 106 that has been engaged in the gear position before the downshifting is released while the second engaging element 107 that has been released in the gear position before the downshifting is engaged, so that the transmission is placed in the gear position to be established after the downshifting.

The delay time setting means 102 predetermines or sets the delay time after determination of the pedal-depressed downshifting determining means 101, to a time that ensures an increase of the engine speed due to depression of the accelerator pedal even if the pedal-depressed downshifting is started while the vehicle is in the power-off state.

When the pedal-depressed downshifting is initiated in the power-off state, therefore, the timing of operating the shift valve 105 is delayed from the determination of the pedal-depressed downshifting determining means 101, so that the engine speed is increased due to depression of the accelerator pedal during this delay time, and the vehicle is shifted from the power-off state into the power-on state by the time when the shift valve 105 is switched so as to effect the shifting operation.

When the pedal-depressed downshifting is initiated in the power-on state, on the other hand, the timing of operating the shift valve is similarly delayed from the determination of the pedal-depressed downshifting determining means 101 though the engine speed is already high and the vehicle is in the power-on state at the time of the determination. Thus, the vehicle is kept in the power-on state during the delay time.

In both cases where the vehicle is in the power-off state and in the power-on state when the pedal-depressed down shifting is determined, therefore, the vehicle is placed in the power-on state where the engine speed Ne has been sufficiently increased when the shifting is actually initiated by switching the shift valve 105. Accordingly, the shifting operation is terminated in almost the same timing in both of the above cases, assuring good shift feeling no matter whether the vehicle is in the power-off or power-on state upon determination of the pedal-depressed downshifting determining means.

The downshift control device as described above may further include line pressure control means 108 for generating a drive command to a line pressure actuator 109 so as to hold a line pressure at a low level at the same time that the downshifting determining means determines that the transmission is to be shifted down due to depression of the accelerator pedal.

In the above arrangement, the control for keeping the line pressure as an engaging element pressure at a low pressure level is immediately effected upon the determination of the pedal-depressed downshifting determining means 101, so as to provide a stable engaging element pressure during the delay time up to start of actual shifting. Thus, even with a variation in the engaging element pressure when the pedal-depressed downshifting is determined, the line pressure is controlled to a target level by the time when the actual shifting operation is started after the delay time elapses, thereby stabilizing the oil pressure during the shifting operation, which result in stable or constant shift time and reduction in shift shocks.

In one preferred form of the downshift control device as described above, the delay time setting means 102 sets a predetermined or fixed delay timer time (e.g., 0.1 second) as the delay time. Thus, the delay time can be most easily determined merely by setting the delay timer time.

In another preferred form of the downshift control device as described above, the delay time setting means 102 monitors an engine speed and a turbine speed when the downshifting determining means 101 determines that the transmission is to be shifted down due to depression of the accelerator pedal, and sets as the delay time a period of time from determination of the downshifting determining means to a point of time when the engine speed exceeds the turbine speed by a predetermined value.

In determining the delay time, the engine speed and turbine speed are monitored by the delay time setting means 102 once it is determined that the transmission is to be shifted down due to depression of the accelerator pedal, and the drive command for switching the shift valve 105 is generated to the shift actuator 104 when the engine speed exceeds the turbine speed. Namely, the period of time from the determination of the pedal-depressed downshifting means 101 to the point of time when the engine speed exceeds the turbine speed by a predetermined value is set as the delay time.

Since the actual downshifting is initiated when the engine speed exceeds the turbine speed by the predetermined value, the vehicle is brought into an almost constant power-on state by the time when the downshifting is actually initiated, even with a variation in the state when the downshifting is determined, thereby assuring a stable shift time.

In a further preferred form of the downshift control device as described above, the delay time setting means 102 sets as the delay time a variable time that is determined depending upon at least one of a vehicle speed, throttle opening, type of downshifting and oil temperature.

For example, the delay time is set to be shorter as the throttle opening before the downshifting is smaller, and set to be longer as the throttle opening is larger. Thus, the delay time is set as a variable time that is determined depending upon the throttle opening, for example.

Accordingly, the optimum delay time can be obtained even with variations in the vehicle speed, throttle opening, type of downshifting or change of oil temperature.

BRIEF DESCRIPTION OF THE DRAWINGS

The invention will be described in greater detail with reference to certain preferred embodiments thereof and the accompanying drawings, wherein.

DETAILED DESCRIPTION OF THE PREFERRED EMBODIMENTS

There will be described the first embodiment of the present invention in the form of a downshift control device for an automatic transmission.

Initially, there will be schematically described the whole construction of the automatic transmission in which the downshift control device of the first embodiment is employed.

Figure 1:
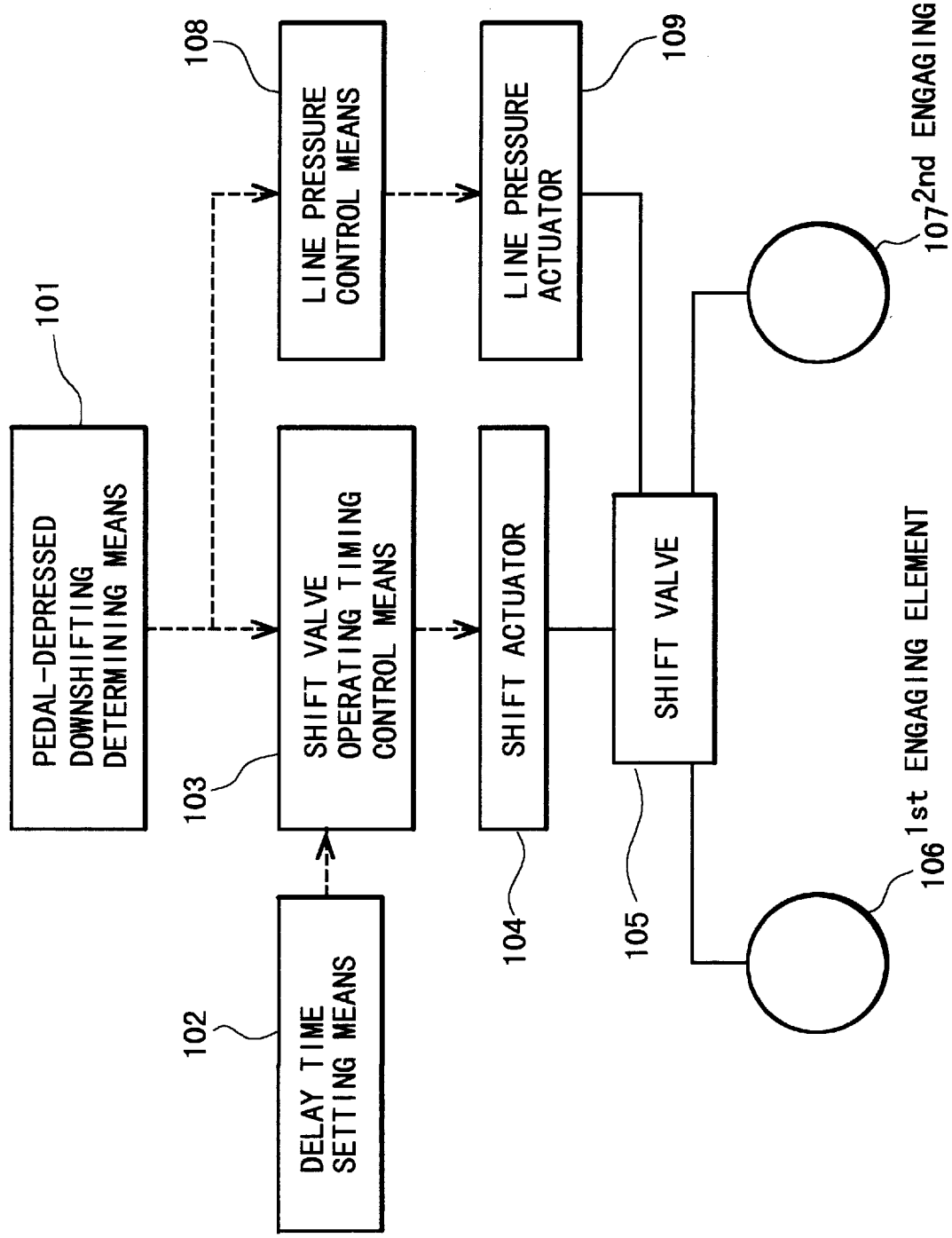
FIG. 1 is a view showing the construction of a downshift control device of an automatic transmission according to the present invention.
Figures 2, 3:
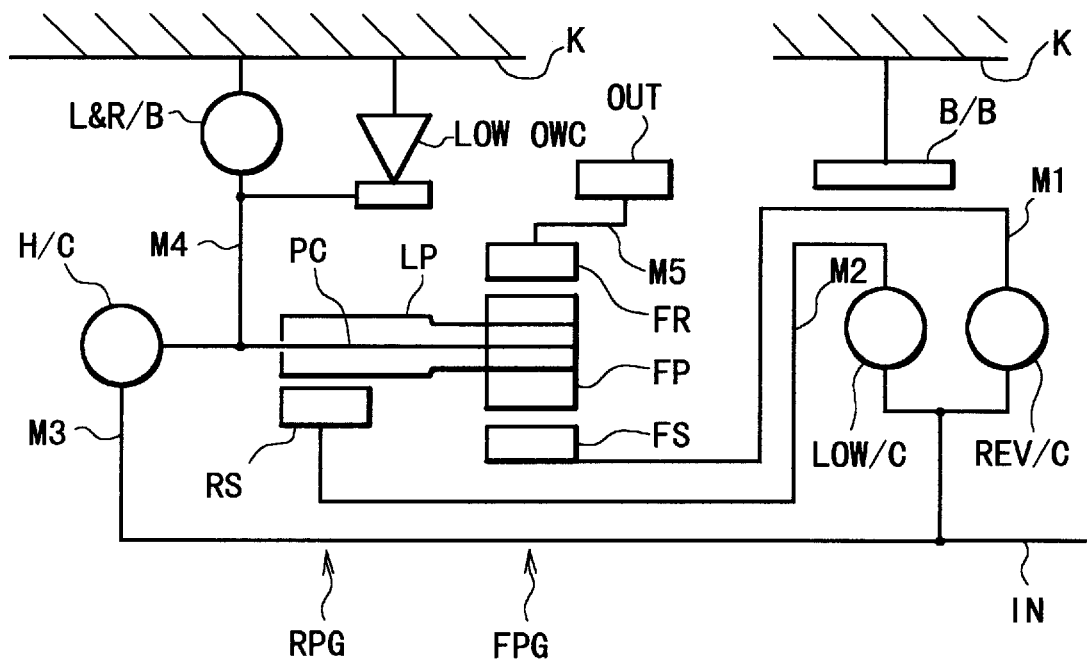
FIG. 2 is a view schematically showing a power transmitting mechanism of the automatic transmission using the hydraulic control device of the first embodiment of the invention.
FIG. 3 is a table showing engaged states of elements of the automatic transmission using the hydraulic control device of the first embodiment.

FIG. 2 is a view schematically showing a power transmitting system of the automatic transmission. In FIG. 2, IN is an input shaft, and OUT is an output gear, while FRG is a front planetary gear system, and RPG is a rear planetary gear system. The front planetary gear system FPG includes a front sun gear FS, a front ring gear FR, and a front pinion FP that is engageable with both of the gears FS, FR. The rear planetary gear system RPG includes a rear sun gear RS, and a long pinion LP that is engageable with the gear RS and also with the front pinion FP. The front pinion FP and the long pinion LP are both supported by a common carrier PC.

In the above-described gear train arrangement, four members, i.e., front sun gear FS, rear sun gear RS, common carrier PC, and front ring gear FR, are involved in shifting actions of the transmission. Further, there are provided a reverse clutch REV/C, high clutch H/C, low clutch L/C, low & reverse brake L&R/B, low one-way clutch LOW O.W.C., and band brake B/B, which serve as shifting elements for connecting a selected one or ones of the above four members to the input shaft IN or fixing the selected member(s) to a case K, so as to establish forward 4-speed, reverse 1-speed gear positions.

The front sun gear FS is connected to the input shaft IN through a first rotary member M1 and the reverse clutch REV/C, and also connected to the case K through the first rotary member M1 and the band brake B/B. The rear sun gear RS is connected to the input shaft IN through a second rotary member M2 and the low clutch L/C. The common carrier PC is connected to the input shaft IN through the high clutch H/C and a third rotary member M3, and is also connected to the case K through a fourth rotary member M4, and the low & reverse brake L&R/B and low one-way clutch LOW O.W.C. connected in series with each other. The front ring gear FR is connected to the output gear OUT through a fifth rotary member M5.

This power transmitting system is characterized in that it does not include a one-way clutch for controlling the shift timing of engaging and unengaging of elements so as to eliminate shift shocks upon shifting-down from the 4th-speed to 3rd-speed gear position, and a clutch that is engaged due to oil pressure and needed for ensuring the effect of engine brakes when the above one-way clutch is employed. Thus, the number of shifting elements is reduced, leading to reduced size and weight of the power transmitting system.

FIG. 3 is a view showing engaged and unengaged states of the shifting elements of the above-described power transmitting system for establishing the forward 4-speed, reverse 1-speed gear positions.

The 1-st-speed gear position is established by hydraulically engaging the low clutch L/C, and hydraulically engaging the low & reverse brake L&R/B (when an engine brake range is selected) or mechanically engaging the low one-way clutch LOW O.W.C. (when the vehicle is accelerated). In this case, the rear sun gear RS is connected to the input shaft IN, and the common carrier PC is fixed, while the front ring gear FR is connected to the output gear OUT.

The 2nd-speed gear position is established by hydraulically engaging the low clutch L/C and the band brake B/B. In this case, the rear sun gear RS is connected to the input shaft IN, and the front sun gear FS is fixed, while the front ring gear FR is connected to the output gear OUT.

The 3rd-speed gear position is established by hydraulically engaging the high clutch H/C and the low clutch L/C. In this case, the rear sun gear RS and common carrier PC are concurrently connected to the input shaft IN, and the front ring gear FR is connected to the output gear OUT, so that the transmission gear ratio becomes equal to 1.

The 4th-speed gear position is established by hydraulically engaging the high clutch H/C and the band brake B/B. In this case, the common carrier PC is connected to the input shaft IN, and the front sun gear FS is fixed, while the front ring gear FR is connected to the output gear OUT, so as to establish the overdrive gear position.

The reverse gear position is established by hydraulically engaging the reverse clutch REV/C and the low & reverse brake L&R/B. In this case, the front sun gear FS is connected to the input shaft IN, and the common carrier PC is fixed, while the front ring gear FR is connected to the output gear OUT.

In the upper right portion of FIG. 3, 2A, 3R and 4A are chambers of a band servo piston for operating the band brake B/B, in which 2A is a 2nd-speed apply pressure chamber, 3R is a 3rd-speed release pressure chamber, and 4A is a 4th-speed apply pressure chamber. The band brake B/B is engaged in the 2nd-speed gear position due to the hydraulic pressure supply to the apply pressure chamber 2A only, and released in the 3rd-speed gear position due to the hydraulic pressure supply to the apply pressure chamber 2A and the release pressure chamber 3R. The band brake B/B is also engaged in the 4th-speed gear position due to the hydraulic pressure supply to all the pressure chambers 2A, 3R and 4A.

Figure 4:
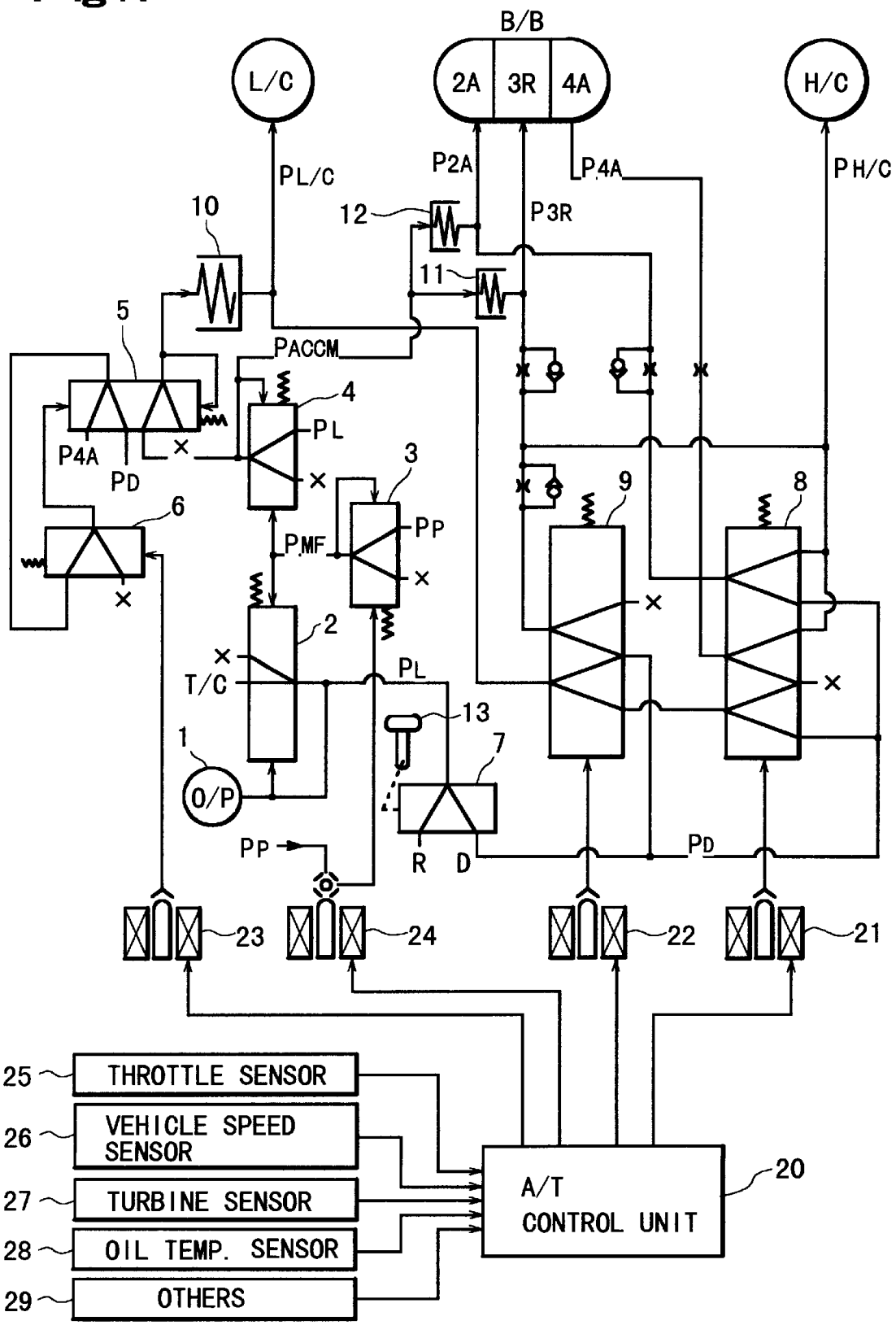
FIG. 4 is a diagram showing the whole control system including a hydraulic control portion and an electronic control portion of the downshift control device of the first embodiment.

FIG. 4 is a control system diagram showing a control valve portion, an electronic control portion, and engaging elements for automatically shifting the transmission to establish one of the 1st-speed to 4th-speed gear positions in the D (drive) range.

As shown in FIG. 4, the low clutch L/C, band brake B/B (2A is 2nd-speed apply pressure chamber, 3R is 3rd-speed release pressure chamber, and 4A is 4th-speed apply pressure chamber), and a high clutch H/C are provided as the engaging elements.

In the control valve portion of FIG. 4, there are provided an oil pump 1, pressure regulator valve 2, pressure modifier valve 3, accumulator control valve 4, low clutch sequence valve 5, low clutch timing valve 6, manual valve 7, shift valve (A) 8, shift valve (B) 9, low clutch accumulator 10, servo release accumulator 11, and 1–2 accumulator 12.

The pressure regulator valve 2 serves to regulate a pressure of oil discharged from the oil pump 1 into a line pressure PL depending upon the level of a modifier pressure PMF. The pressure modifier valve 3 serves to reduce a pilot pressure PP to prepare the modifier pressure PMF. The accumulator control valve 4 reduces the line pressure PL depending upon the level of the modifier pressure PMF to prepare an accumulator control pressure PACCM.

The low clutch sequence valve 5 and low clutch timing valve 6 are adapted to control the back pressure of the low clutch accumulator 10 so as to appropriately control the timing of engaging and releasing the low clutch L/C upon shifting-up to the 4th-speed gear position or shifting-down from the 4th-speed gear position.

The manual valve 7 serves to deliver the line pressure PL to appropriate control valves according to a selected position of a selector lever 13. The shift valve (A) 8 and shift valve (B) 9 are adapted to effect switching of oil paths to establish each of the 1st-speed to 4th-speed (overdrive) gear positions according to the operation of respective shift solenoids.

The low clutch accumulator 10 permits smooth engagement of the low clutch L/C and appropriately controls the timing of engaging and releasing the low clutch L/C. The servo release accumulator 11 permits smooth engagement of the high clutch H/C and smooth release of the band brake B/B upon shifting from the 2nd-speed gear position to the 3rd-speed gear position. The 1–2 accumulator 12 permits smooth engagement of the band brake B/B upon shifting from the 1st-speed gear position to the 2nd-speed gear position.

The electronic control portion of FIG. 4 includes shift solenoid (A) 21, shift solenoid (B) 22, timing solenoid 23 and line pressure solenoid 24, as actuators for controlling oil pressures according to drive commands generated by the A/T control unit 20. Of these solenoids, the line pressure solenoid 24 is a duty solenoid in which the oil pressure level is continuously varied depending upon the duty ratio, and the shift solenoid (A) 21, shift solenoid (B) 22 and timing solenoid 23 are on-off solenoids that are switched between one state where the pilot pressure PP is supplied and the other state where the pilot pressure PP is drained.

The A/T control unit 20 receives as input information various signals from various sensors, such as a throttle sensor 25 for detecting the throttle opening of a throttle valve, a vehicle speed sensor 26 for detecting the vehicle speed, a turbine sensor 27 for detecting the rotating speed of a turbine runner, oil temperature sensor 28 for detecting the oil temperature, and other sensors and switches 29.

[Basic Operation of Electronic Control]

(1) Shift Control

The A/T control unit 20 generates ON-or OFF-command to the shift solenoid (A) 21 and shift solenoid (B) 22 to perform the shift control for automatically establishing one of the 1st-speed to 4th-speed gear positions while the D (drive) range is selected.

Figures 5, 6:
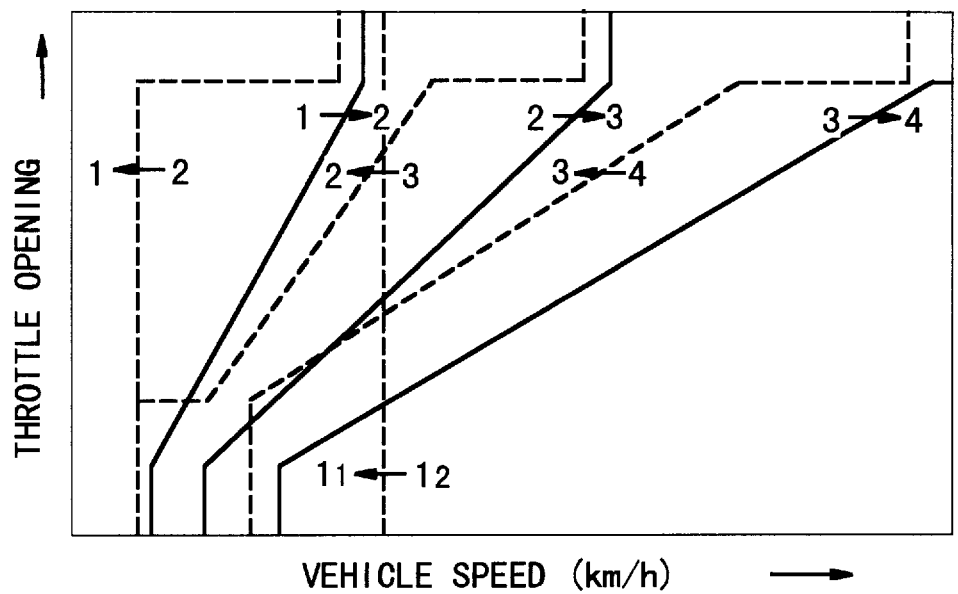
FIG. 5 is a table showing operating states of shift solenoids of the hydraulic control device of the first embodiment.
FIG. 6 is a graph showing one example of gear change point characteristics employed by the hydraulic control device of the first embodiment.

More specifically, a gear change command is generated based on the graph of FIG. 6 indicating gear change points in relation to the detected throttle opening and vehicle speed, when the current point (relationship between the throttle opening and vehicle speed) on the graph passes one of upshifting and downshifting lines as indicated by solid and dashed lines, respectively. According to this gear change command, the gear position to be next established is determined, and an ON-or OFF-command is generated to the shift solenoid (A) 21 and/or shift solenoid (B) 22 according to the table of the operating states of these solenoids as shown in FIG. 5, so as to establish the determined gear position.

(2) Line Pressure Control

To control the line pressure PL, a duty-ratio drive command is generated by the A/T control unit 20 to the line pressure solenoid 24.

More specifically, the pressure modifier valve 3 regulates the pilot pressure PP into the modifier pressure PMF based on the output solenoid pressure applied from the line pressure solenoid 24. The pressure regulator valve 2 then prepares line pressure PL using this modifier pressure PMF as an operating signal pressure.

The thus prepared line pressure PL passes through the manual valve 7, and shift valve (A) 8 and/or shift valve (B) 9, which effect switching of oil paths while the D range is selected, and selectively fed to a clutch oil chamber of the low clutch L/C, oil chambers 2A, 3R, 4A of the band brake B/B, and a clutch oil chamber of the high clutch H/C, to provide an engaging pressure.

To ensure engagement of the engaging elements with minimized slips, therefore, the line pressure PL is basically controlled according to the magnitude of the torque transmitted through the transmission, depending upon the throttle opening and shift range position, for example.

(3) Accumulator Back Pressure Control

To control the back pressure of the low clutch accumulator 10, an ON-or OFF-command is generated from the A/T control unit 20 to the timing solenoid 23.

More specifically, when an ON-command is generated to the timing solenoid 23, and the transmission is placed in any one of the 1st- to 3rd-speed gear positions where the back pressure is applied to the accumulator 10, the low clutch sequence valve 5 is held in a position for supplying the accumulator control pressure PACCM to the low clutch accumulator 10 until a 4th-speed apply pressure P4A is generated.

When the transmission is shifted up from the 3rd-speed to 4th-speed gear position, and the 4th-speed apply pressure P4A is generated, the low clutch sequence valve 6 is brought into communication with a drain, and the back pressure of the low clutch accumulator 10 is released.

When the transmission is shifted down to the 3rd-speed position from the 4th-speed gear position where the accumulator back pressure is released while the timing solenoid 23 is receiving the ON command, the command fed to the timing solenoid 23 is changed from the ON-command to the OFF-command while monitoring the gear ratio, so that the back pressure of the low clutch accumulator 10 is increased.

Thus, upon upshifting from the 3rd-speed to 4th-speed gear position, the 4th-speed apply pressure P4A is generated so as to release the low clutch L/C in the optimum upshifting timing. Upon downshifting from the 4th-speed to 3rd-speed gear position, on the other hand, a command is generated to the timing solenoid 23 irrespective of the shift oil pressure, so as to engage the low clutch L/C in the optimum downshift timing.

[3–2 Downshift Control]

Figure 7:
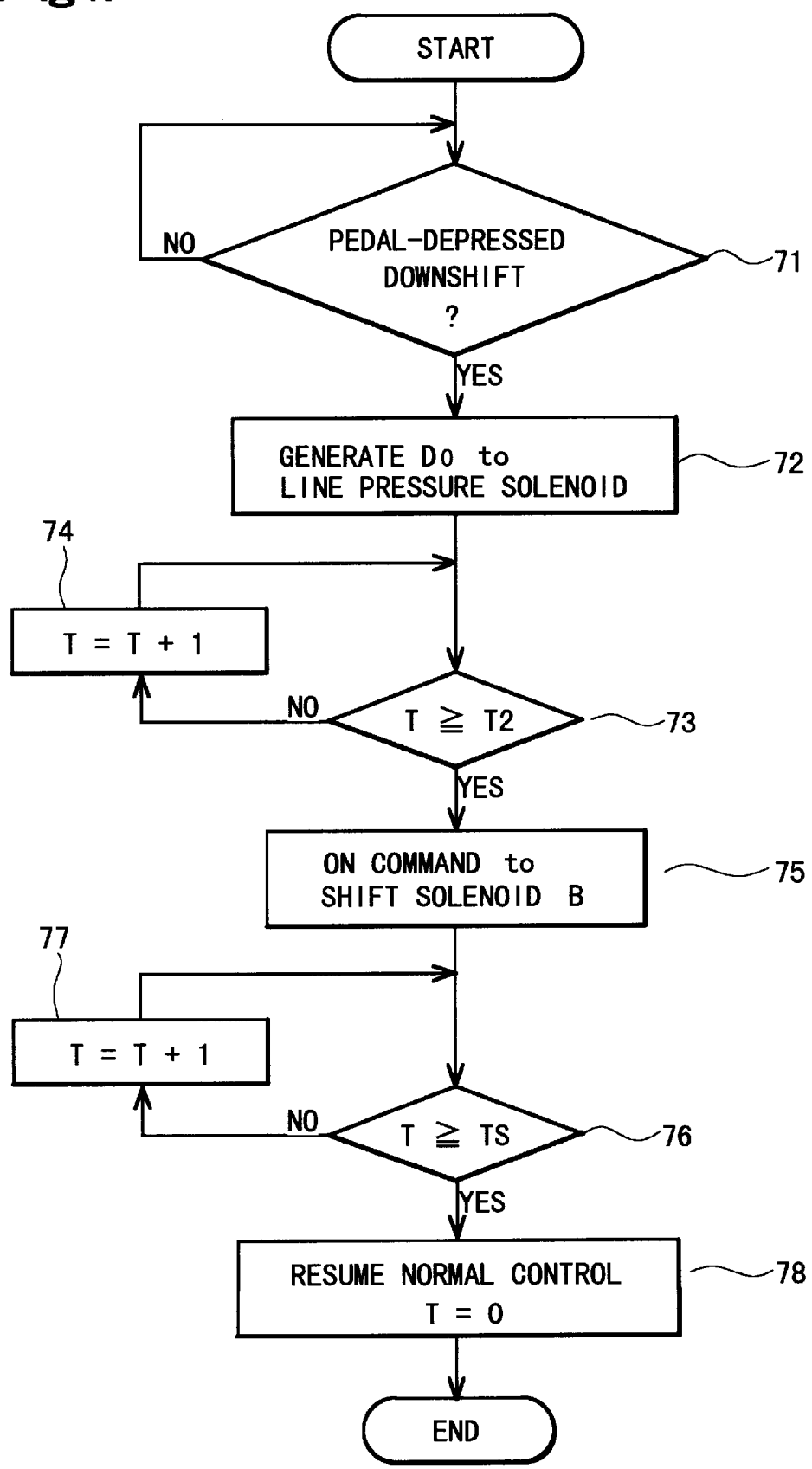
FIG. 7 is a flow chart showing the flow of 3rd-speed to 2nd-speed pedal-depressed downshift control performed by an A/T control unit of the first embodiment.

FIG. 7 is a flow chart showing the flow of the downshift control performed by the A/T control unit 20 when the transmission is shifted down from the 3rd-speed to 2nd-speed gear position due to depression of an accelerator pedal, in which control the high clutch H/C (corresponding to the first engaging element) is released and the band brake B/B (corresponding to the second engaging element) is engaged. There will be described each step of the control flow shown in FIG. 7.

In step 71, it is determined whether the transmission is being shifted down from the 3rd-speed to 2nd-speed gear position due to depression of the accelerator pedal. An affirmative decision is obtained in this step if two conditions are satisfied, that is, the current point (relationship between the throttle opening and the vehicle speed) on the graph of FIG. 6 indicating gear change points passes the 3–2 downshifting line and a 3–2 downshift command is generated, and the throttle opening is being increased.

The increase of the throttle opening is determined by calculating a differential value dTH of a detected value TH of the throttle opening received from the throttle sensor 25, and determining whether the obtained differential value DTH is larger than zero.

If it is determined that the transmission is shifted down from the 3rd-speed to 2nd-speed gear position with the accelerator pedal being depressed, step 72 is executed to generate a command, i.e., a constant duty ratio D0, to the line pressure solenoid 24 (corresponding to the line pressure actuator), so that the line pressure PL is kept at a predetermined low pressure level.

Instep 73, it is determined whether a timer value T representing the time elapsed after the generation of the pedal-depressed 3rd- to 2nd-speed downshift command in step 71 is equal to or larger than a predetermined shift delay timer value T2 (e.g., numerical value corresponding to 0.1 second).

When a negative decision (NO) is obtained in stop 73, step 74 is executed to increase the time value T to T+1. The determination in step 73 is made upon completion of each time cycle corresponding to numerical value 1.

If an affirmative decision (YES) is obtained in step 73, step 75 is executed to output an ON command to the shift solenoid (B) 22 (corresponding to the shift actuator).

In step 76, it is determined whether the timer value T representing the time elapsed after generation of the 3–2 downshift command is equal to or larger than a predetermined shift completion timer value TS (e.g., numerical value corresponding to 1 second).

If a negative decision (NO) is obtained in step 76, step 77 is executed to increase the timer value T to T+1. The determination in step 76 is made upon completion of each time cycle corresponding to numerical value 1.

If an affirmative decision (YES) is obtained in step 76, step 78 is executed to resume normal line pressure control, from the line pressure control performed during shifting in which the line pressure solenoid 24 is controlled with the duty ratio D0. Further, the timer value T is reset to zero.

Figure 8:
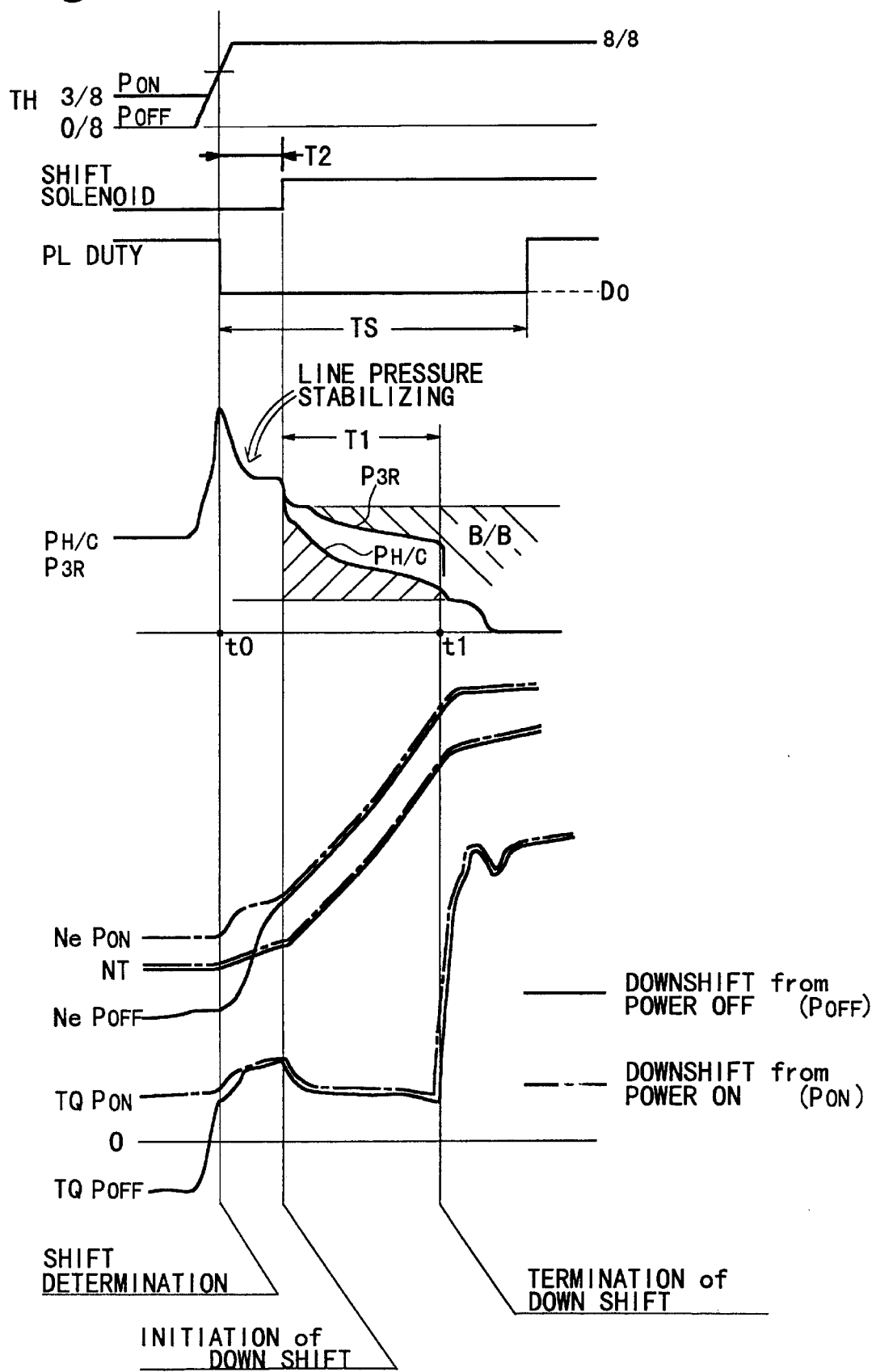
FIG. 8 is a time chart showing the 3rd-speed to 2nd-speed pedal-depressed downshift control operation of the first embodiment.

FIG. 8 is a time chart indicating the pedal-depressed 3rd- to 2nd-speed downshift operation where the above downshift control is performed.

The pedal-depressed 3–2 downshifting is initiated by holding the shift solenoid (A) 21 in the OFF state, and switching the shift solenoid (B) 22 from the OFF state to the ON state as shown in FIG. 5. As a result, the spool of the shift valve (B) 9 is shifted to switch the oil paths, so as to release or discharge the high clutch pressure PH/C of the high clutch H/C that has been engaged in the 3rd-speed gear position, and the 3rd-speed release pressure P3R of the band brake B/B that has been released in the 3rd-speed gear position, thereby to release the high clutch H/C and engage the band brake B/B. Thus, the 2nd-speed gear position to be established after the shifting is achieved.

During the pedal-depressed 3–2 downshifting, the control as shown in FIG. 7, namely, the pedal-depressed 3–2 downshift control is performed along with the line pressure control for maintaining the line pressure PL at the fixed low line pressure, and the timing control for generating the ON command to the shift solenoid (B) 22 after a lapse of delay time counted as the shift delay timer value T2 after generation of the pedal-depressed 3–2 downshift command, so as to switch the shift valve (B) and actually initiate the shift operation.

In a delay time region between the generation of the downshift command and the initiation of the actual shifting, therefore, the line pressure control is performed to maintain the line pressure PL as an engaging element pressure at the low pressure level, whereby the high clutch pressure PH/C and the 3rd-speed release pressure P3R are stabilized by the time when the shifting is actually initiated, as shown in the middle portion of the time chart of FIG. 8 that indicate oil pressure characteristics.

When the transmission is shifted down due to depression of the accelerator pedal from the power-off state (the throttle opening is changed from 0/8 to 8/8), the engine speed Ne is increased as the accelerator pedal is depressed during the delay time between the generation of the downshift command and the initiation of the actual shifting (as indicated by the solid line Ne POFF in the lower part of FIG. 8). At the point of time when the shifting is initiated, the engine speed Ne reaches substantially the same level as that achieved when the transmission is shifted down due to depression of the accelerator pedal from the power-on state. Namely, the engine speed Ne reached at the point of time when the shifting initiated indicates that the power-off state has been changed to the power-on state.

When the transmission is shifted down due to depression of the accelerator pedal from the power-on state (the throttle opening is changed from 3/8 to 8/8), the engine speed Ne is already high at the time of generation of the 3–2 downshift command, and is increased only by a small degree during the delay time (as indicated by the broken line Ne PON in the lower part of FIG. 8) so that the vehicle is kept in the power-on state.

In both of the cases where the vehicle is in the power-off state and in the power-on state when the downshift command is generated, therefore, the vehicle is placed in the power-on state in which the engine speed Ne has been sufficiently increased when the shifting is actually initiated by generating the ON command to the shift solenoid (B) 22 to switch the shift valve (B) 9. Accordingly, the shifting operation is terminated in almost the same timing no matter whether the vehicle is in the power-off or power-on state upon generation of the 3–2 downshift command.

Consequently, where the capacity of the servo release accumulator 11 or other parameter is appropriately determined so as to set the shelf pressure or steady-state level of the 3rd-speed release pressure P3R at a level that ensures the optimum timing in which the transmission is shifted down from the power-on state, there arise no shocks that have been conventionally experienced due to abrupt elimination of the steady-state level of the pressure P3R even if the transmission is shifted down from the power-off state, as indicated in the lower part of FIG. 8 indicating characteristics of the transmitted torque TQ. Thus, good shift feeling can be obtained in the pedal-depressed downshifting from the power-off state, as in the pedal-depressed downshifting from the power-on state.

In addition, due to the line pressure control, the high clutch pressure PH/C and the 3rd-speed release pressure P3R are controlled to stable pressures of almost the same level at the point of time when the shifting is actually initiated, even with variations in the high clutch pressure PH/C and the 3rd-speed release pressure P3R at the point of time when the downshift command is generated. Further, the line pressure PL is stably maintained at the same level from the beginning of the shifting until completion of the shifting.

Consequently, the shelf pressure (accumulator pressure) is maintained for a substantially constant period of time during the downshifting even with a variation in the line pressure PL that appears when the downshift command is generated, assuring a stable or constant shift time. Since the shifting operation is completed in substantially constant timing, shocks due to a difference in the timing can be avoided.

There will be explained effects of the present embodiment.

(1) After generation of the downshift command to shift down the transmission from the 3rd-speed to 2nd-speed gear position due to depression of the accelerator pedal, the shift valve operating timing control is effected to generate the ON-command to the shift solenoid (B) 22 to switch the shift valve (B) 9 upon a lapse of the delay time that is set by the shift delay timer value T2. This timing control can be easily performed without determining the operated state of the accelerator pedal before the generation of the 3-2 downshift command, or setting a plurality of control characteristics. The above timing control still assures good shift feeling no matter whether the pedal-depressed 3rd-speed to 2nd-speed downshifting takes place from the power-on state or power-off state.

(2) The present control device performs the line pressure control upon shifting, such that the duty ratio drive command is generated to the line pressure solenoid 24 to thereby hold the line pressure PL at a low level at the same time that the downshift command is generated to shift the transmission from the 3rd-speed to 2nd-speed gear position due to depression of the accelerator pedal. Thus, the control device assures a stable shift time, and stable oil pressures during shifting which lead to reduction of shocks.

(3) In the present control device, the delay time can be most easily determined based on the predetermined or fixed shift delay time T2.

Figure 9:
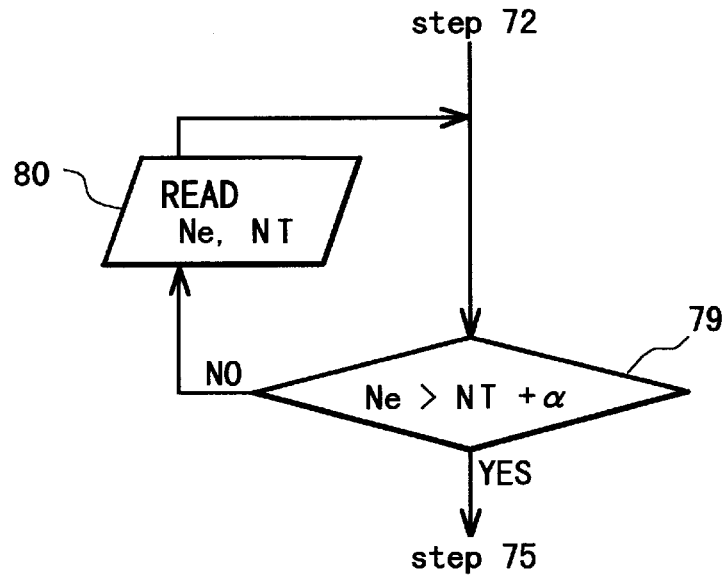
FIG. 9 is a flow chart showing the operation of setting the delay time according to the second embodiment of the invention.

FIG. 9 is a flow chart showing a subroutine for setting the delay time according to the second embodiment of the present invention.

In step 79, it is determined whether the engine speed Ne is equal to or higher than a value obtained by adding a predetermined value α (which is 0 or larger and arbitrarily determined) to the turbine speed NT.

If a negative decision (NO) is obtained in step 79, step 80 is executed to read a new set of the engine speed Ne and turbine speed NT.

In the above-described subroutine, the engine speed Ne and turbine speed NT are monitored after the 3rd-speed to 2nd-speed accelerated downshifting is determined, and, when Ne>NT+α is satisfied, the ON command for switching the shift valve (B) is generated to the shift solenoid (B) 22. Namely, the time elapsed after generation of the 3–2 downshift command until when Ne>NT+α is satisfied is set as the delay time.

Thus, the actual downshifting is initiated when the engine speed Ne exceeds the turbine speed NT, and thus the vehicle is in a substantially constant power-on state (relationship between Ne and NT) upon initiation of the downshifting, assuring a stable shift time, even with a variation in the power state when the downshift command is generated.

Figure 10:
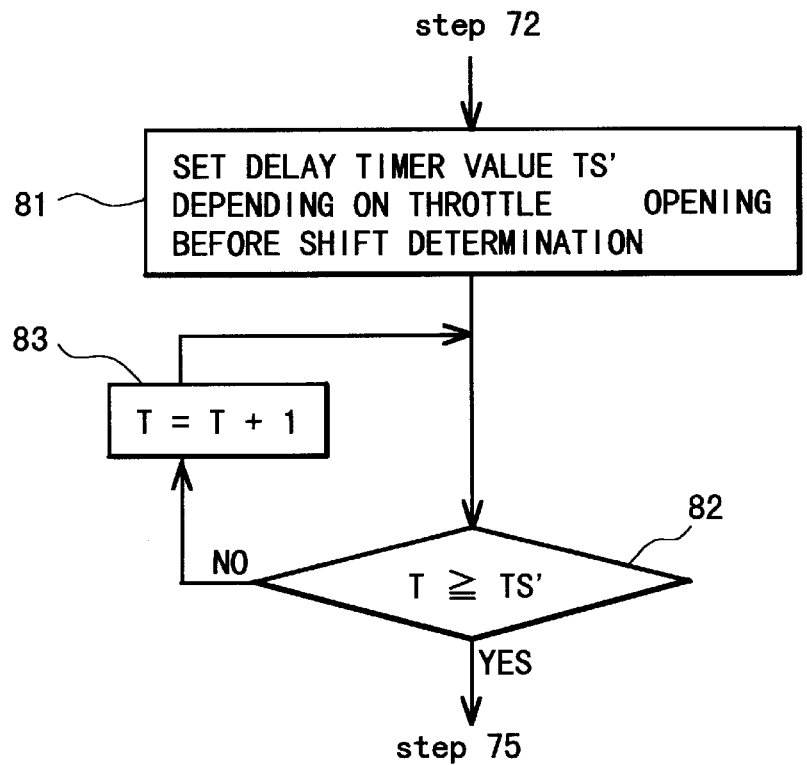
FIG. 10 is a flow chart showing the operation of setting the delay time according to the third embodiment of the invention.
Figure 11:
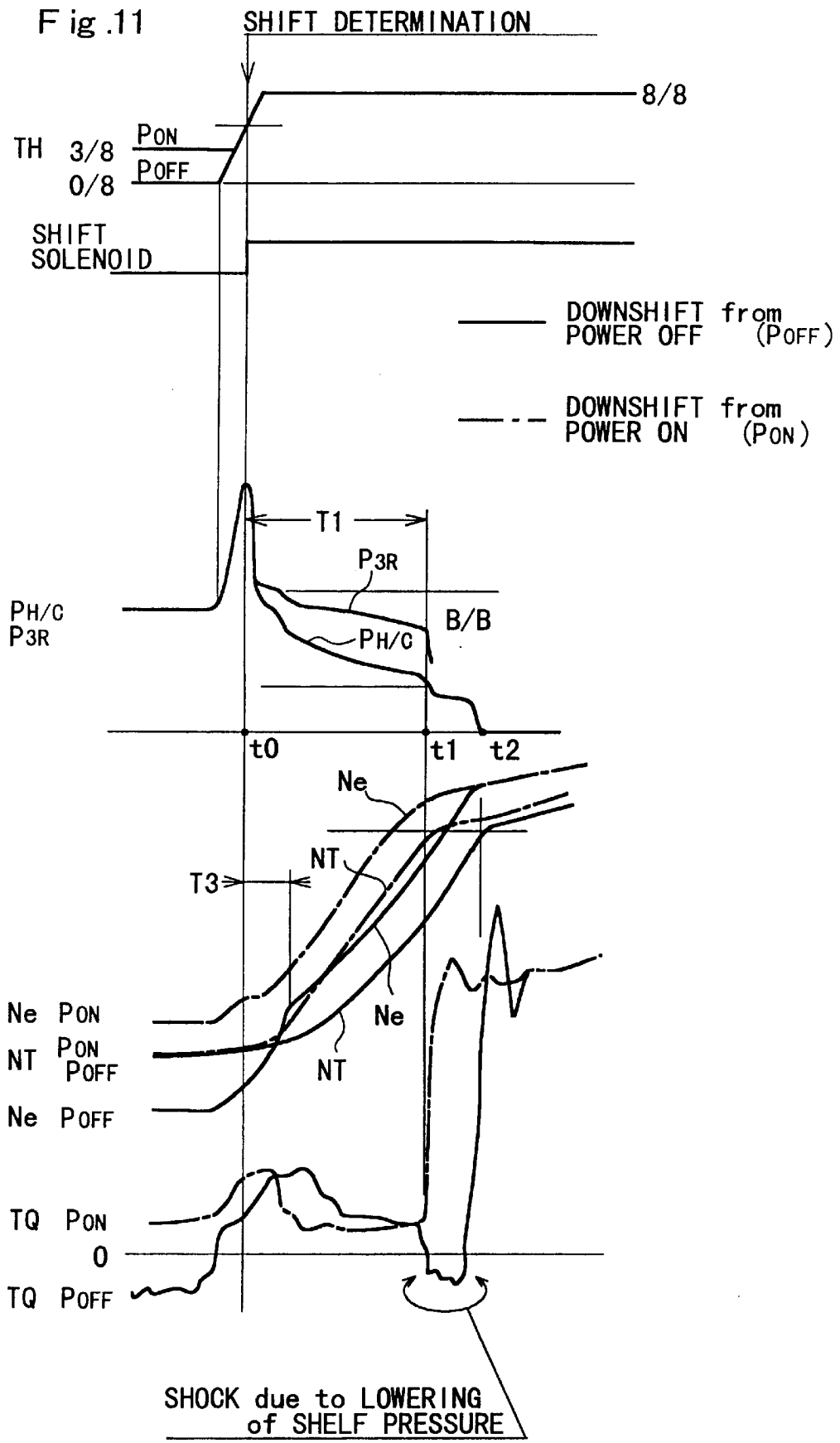
FIG. 11 is a time chart showing a conventional 3rd-speed to 2nd-speed pedal-depressed downshift control operation in which the shifting is initiated upon generation of a shift command.

FIG. 10 is a flow chart showing a subroutine for setting the delay time according to the third embodiment of the present invention.

In step 81, a shift delay timer value TS' is determined depending upon the throttle opening TH before generation of the downshift command. In step 82, it is determined whether the timer value T representing the time elapsed after the generation of the downshift command is equal to or larger than the shift delay timer value TS'. In step 83, the timer value T is incremented to T+1.

Thus, when the downshift command is generated to shift down the transmission from the 3rd-speed to 2nd-speed gear position due to depression of the accelerator pedal, the delay time is determined depending upon the throttle opening TH before the generation of the downshift command. More specifically, the delay time is shortened as the throttle opening TH is smaller, and is prolonged as the throttle opening TH is larger. Thus, the shift delay timer value TS' is set as a variable time. Upon a lapse of the delay time represented by the shift delay timer value TS', the ON command for switching the shift valve (B) 9 is generated to the shift solenoid (B) 22.

Since the delay time varies with the degree of the throttle opening TH, the optimum delay time can be set so that the shifting is completed in substantially fixed timing irrespective of the degree of the throttle opening TH before generation of the downshift command. Accordingly, the optimum delay time can be set irrespective of variations in the vehicle speed, throttle opening, kind of downshifting and oil temperature.

While the control for the 3rd-speed to 2nd-speed downshifting due to depression of the accelerator pedal is illustrated in the first to third embodiments, the downshift control of the present invention may be also applied to 4th-speed to 3rd-speed and 4th-speed to 2nd-speed downshifting due to depression of the accelerator pedal, and to 5th-speed to 4th-speed downshifting and 5th-speed to 3rd-speed downshifting when the automatic transmission has five gear positions.

While the delay time is varied depending upon the throttle opening in the third embodiment, the delay time may be variably determined depending upon the vehicle speed, type of downshifting, or the oil temperature, or depending upon two or more parameters of the vehicle speed, throttle opening, type of downshifting, and oil temperature.

What is claimed is:

1. A downshift control device for an automatic transmission, wherein a drive command is generated to a shift actuator when a shift command to change a gear ratio of the transmission is generated, to switch a shift valve and change oil paths, thereby to release a first engaging element that has been engaged in a first gear position established by the automatic transmission before the shifting operation, and engage a second engaging element that has been released in said first gear position, so as to establish a second gear position after the shifting operation, said downshift control device comprising:

pedal-depressed downshifting determining means for determining whether the automatic transmission is to be shifted down due to depression of an accelerator pedal;

delay time setting means for setting a delay time that ensures an increase of an engine speed in the first gear position established before the shifting position due to depression of the accelerator pedal; and shift valve operating timing control means for generating said drive command for switching said shift valve to said shift actuator when said delay time elapses after said pedal-depressed downshifting determining means determines that the transmission is to be shifted down due to depression of the accelerator pedal;

wherein the increase in engine speed is obtained in both a power-on and a power-off state when the downshift command is generated.

2. A downshift control device for an automatic transmission, wherein a drive command is generated to a shift actuator when a shift command to change a gear ratio of the transmission is generated, to switch a shift valve and change oil paths, thereby to release a first engaging element that has been engaged in a first gear position established by the automatic transmission before the shifting operation, and engage a second engaging element that has been released in said first gear position, so as to establish a second gear position after the shifting operation, said downshift control device comprising:

pedal-depressed downshifting determining means for determining whether the automatic transmission is to be shifted down due to depression of an accelerator pedal;

delay time setting means for setting a delay time that ensures an increase of an engine speed due to depression of the accelerator pedal;

shift valve operating timing control means for generating said drive command for switching said shift valve to said shift actuator when said delay time elapses after said pedal-depressed downshifting determining means determines that the transmission is to be shifted down due to depression of the accelerator pedal; and line pressure control means for generating a drive command to a line pressure actuator so as to hold a line pressure at a low level at the same time that said pedal-depressed downshifting determining means determines that the transmission is to be shifted down due to depression of the accelerator pedal.

3. A downshift control device according to claim 1, wherein said delay time setting means sets a predetermined delay timer time as said delay time.

4. A downshift control device for an automatic transmission, wherein a drive command is generated to a shift actuator when a shift command to change a gear ratio of the transmission is generated, to switch a shift valve and change oil paths, thereby to release a first engaging element that has been engaged in a first gear position established by the automatic transmission before the shifting operation, and engage a second engaging element that has been released in said first gear position, so as to establish a second gear position after the shifting operation, said downshift control device comprising:

pedal-depressed downshifting determining means for determining whether the automatic transmission is to be shifted down due to depression of an accelerator pedal;

delay time setting means for setting a delay time that ensures an increase of an engine speed due to depression of the accelerator pedal;

shift valve operating timing control means for generating said drive command for switching said shift valve to said shift actuator when said delay time elapses after said pedal-depressed downshifting determining means determines that the transmission is to be shifted down due to depression of the accelerator pedal; and wherein said delay time setting means monitors an engine speed and a turbine speed when said pedal-depressed downshifting determining means determines that the transmission is to be shifted down due to depression of the accelerator pedal, and sets as said delay time a period of time from a point of time when said pedal-depressed downshifting determining means determines that the transmission is to be shifted down to a point of time when the engine speed exceeds the turbine speed by a predetermined value.

5. A downshift control device for an automatic transmission, wherein a drive command is generated to a shift actuator when a shift command to change a gear ratio of the transmission is generated, to switch a shift valve and change oil paths, thereby to release a first engaging element that has been engaged in a first gear position established by the automatic transmission before the shifting operation, and engage a second engaging element that has been released in said first gear position, so as to establish a second gear position after the shifting operation, said downshift control device comprising:

pedal-depressed downshifting determining means for determining whether the automatic transmission is to be shifted down due to depression of an accelerator pedal;

delay time setting means for setting a delay time that ensures an increase of an engine speed due to depression of the accelerator pedal; and shift valve operating timing control means for generating said drive command for switching said shift valve to said shift actuator when said delay time elapses after said pedal-depressed downshifting determining means determines that the transmission is to be shifted down due to depression of the accelerator pedal;

wherein said delay time setting means sets as said delay time a variable time that is determined depending upon at least one of a vehicle speed, throttle opening, type of downshifting and oil temperature.

* * * * *